United States Patent Office 3,772,443
Patented Nov. 13, 1973

---

3,772,443
5-BROMO-5-NITRO-1,3-DIOXANE, PROCESS AND ANTIMICROBIAL COMPOSITIONS
Richard Wessendorf, Hilden, and Horst Bellinger, Dusseldorf, Germany, assignors to Henkel & Cie G.m.b.H., Dusseldorf, Germany
No Drawing. Original application Apr. 17, 1970, Ser. No. 29,692, now abandoned. Divided and this application Oct. 20, 1971, Ser. No. 190,827
Claims priority, application Germany, Apr. 22, 1969, P 19 20 298.3
Int. Cl. A01n 9/28
U.S. Cl. 424—278                                        4 Claims

ABSTRACT OF THE DISCLOSURE 5-bromo-5-nitro-1,3-dioxane use in antimicrobial compositions and its use in preventing the growth of microorganisms.

---

This is a division of application Ser. No. 29,692, filed Apr. 17, 1970, now abandoned.

THE PRIOR ART

The antimicrobial activity of many aliphatic and aromatic nitro compounds is known, in which case both bactericidal and fungicidal activity may be present. Thus, for example, 2 - bromo - 2 - nitro-propanediol-1,3, which possesses a broad spectrum of action, is recommended as a preservative. Further, an antimicrobial substance of high activity has become known in 1-bromo-1-nitro-3,3,3-trichloropropanol-2, which compound ensures a positive protection against both gram-positive and gram-negative bacteria and against fungal attack.

A notable disadvantage of the bromonitro alcohols, however, is their sensitivity towards alkali, owing to which their use in the cleaning and disinfectant fields is essentially restricted.

OBJECTS OF THE INVENTION

An object of the present invention is the obtaining of an antimicrobial substance as well as antimicrobial compositions containing this substance, which is active at very low concentrations of active substance against both gram-positive and gram-negative bacteria as well as fungi, which antimicrobial substance is stable in the alkaline region and displays its full activity in neutral or acid regions as well.

Another object of the invention is the obtaining of 5-bromo-5-nitro-1,3-dioxane.

Another object of the invention is the development of a process for the production of 5-bromo-5-nitro-1,3-dioxane which comprises condensing 2-bromo-2-nitropropanediol-1,3 with formaldehyde in the presence of a strong acid and recovering said 5-bromo-5-nitro-1,3-dioxane.

A further object of the invention is the obtaining of an antimicrobial composition of an inert carrier and a minor amount of 5-bromo-5-nitro-1,3-dioxane.

These and other objects of the invention will become more apparent as the description thereof proceeds.

DESCRIPTION OF THE INVENTION

The above objects have been achieved and the disadvantages of the prior art have been overcome in the discovery of 5-bromo-5-nitro-1,3-dioxane having the formula

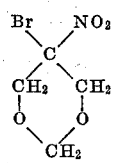

This compound, a cyclic acetal of 2-bromo-2-nitro-propane-diol-1,3, has now been found to possess an excellent activity against bacteria and fungi in very low concentrations. The new compound is stable in the alkaline region and also is only decomposed by strong acids when hot, into 2-bromo-2-nitro-propanediol-1,3 and formaldehyde which two likewise are very active antimicrobial substances.

5-bromo-5-nitro-1,3-dioxane is readily prepared by reacting 2-bromo-2-nitro-propanediol-1,3 with formaldehyde or a material which forms formaldehyde under the reaction conditions, such as paraformaldehyde in the presence of an acid catalyst and recovering the desired compound. Preferably the reaction is conducted under substantially anhydrous conditions and the water produced by the reaction is either removed by distillation or absorbed by the catalyst. The reactants are employed in substantially equimolar amounts. However, a small excess of either reactant may be employed. A preferred ratio of reactants is 1.01 mols of 2-bromo-2-nitro-propanediol-1,3 to 1 mol of formaldehyde. If the formaldehyde is introduced as paraformaldehyde, it is charged in an amount equivalent to its formaldehyde content. The reaction is conducted at elevated temperatures and optionally in the presence of anhydrous organic solvents. If a solvent is employed, it is preferable to utilize a solvent from which water may be azeotropically distilled.

The acid catalyst employed is preferably a strong acid such as a strong mineral or organic acid like p-toluenesulfonic acid. Preferably a strong mineral acid which combines with the water of reaction is employed such as a condensed polyphosphoric acid, especially one having a $P_2O_5$ content of from 75% to 84%.

In the antimicrobial compositions of the present invention, 5 - bromo - 5 - nitro-1,3-dioxane is incorporated therein, preferably in an amount of from 0.05% to 5%, especially 0.1% to 1%, by weight.

The following examples illustrate the practice of the invention without being deemed limitative in any manner.

Example 1

200 gm. (1 mol) of 2-bromo-2-nitro-propanediol-1,3, 30 gm. (1 mol calculated as formaldehyde) of paraformaldehyde and 1 gm. of p-toluenesulfonic acid were dissolved in 200 ml. of benzene. The solution was heated to boiling while stirring. 13 ml. of water were then removed by azeotropic distillation. After distilling off the benzene and washing several times with a dilute 5% sodium hydrogen carbonate solution and water, 120.5 gm. of an oil substance remained which only crystallized after relatively long storage. The purification was effected by steam distillation. Yield: 110 gm. of 5-bromo-5-nitro-1,3-dioxane (corresponding to 52% of theory), melting point=52° C.

Example 2

20.2 gm. (0.101 mol) of 2-bromo-2-nitro-propane-diol-1,3, 3 gm. (0.1 mol, calculated as formaldehyde) of paraformaldehyde and 5 gm. of polyphosphoric acid ($P_2O_5$ content 84%) were treated for 2 hours at 90° C. and 0.05 mm. Hg in a sublimation apparatus. Colorless crystals of a melting point of 49° C. separated on the cooling finger member. Yield: 19.3 gm. of 5-bromo-5-nitro-1,3-dioxane (corresponding to 91% of theory).

Example 3

202 gm. (1.01 mol) of 2-bromo-2-nitro-propane-diol-1,3 and 30 gm. (1 mol, calculated as formaldehyde) of paraformaldehyde were mixed with 50 gm. of polyphosphoric acid ($P_2O_5$ content 75%) and the mixture was kept at 90° C. for 2 hours, with stirring. The cooled batch was extracted three times with 150 ml. aliquots of methylene chloride. The purified organic phases were combined, washed with an aqueous 5% sodium hydrogen carbonate solution and then with water. After removal of the solvent under a low vacuum, 206 gm. of 5-bromo-5-nitro-1,3-dioxane remained as a colorless oil, which solidified on cooling. Yield: 97.2% of theory, melting point 49° C.

The product obtained was found to be homogeneous in a thin-film chromatogram. The product was further characterized by elemental analysis, molecular weight determination, and by the infrared spectrum, which showed the following absorption bands: 1560, 1550, 1450, 1330, 1290, 1190, 1135, 1060, 1023, 950, 930, 920, 912, 880, 840, 680 and 625 cm.$^{-1}$.

In the comparative experiments referred to below, the 5-bromo-5-nitro-1,3-dioxane according to the invention was compared with 2-bromo-2-nitro-propanediol-1,3 known from the literature and 1,3-dioxane.

The inhibiting concentrations of the compounds to be examined were found by means of the so-called plate test. This test represents a modified form of the dilution test for the determination of the microbiostatic action described in the instructions for testing chemical disinfectants of the "Deutschen Gesellschaft für Hygiene und Mikrobiologie," under the methods for the preliminary examination of such materials, and can be used with advantage in various tests. Instead of the use of liquid culture media indicated therein, a solid culture media is employed. The advantage of solid culture media is clearly obvious, especially in the case of tests of the activity of the substances towards fungi.

The desired test concentrations were prepared by mixing measured amounts of the solutions of suitable concentrations of the substance with measured amounts of diluted broth-agar or beer wort-agar in sterile Petri dishes. 0.1 to a maximum of 1 ml. of the solutions of substance were pipetted in, the total volume in the Petri dishes after mixing with the culture medium amounting to 10 ml. After the solidifying of the culture medium, the surface was inoculated with the suspension of the test germ in broth or wort.

The incubation was effected at 37° and 30° C. in the incubator and lasted 8 days when bacteria or *Candida albicans* were used, and 21 days in the case of use of Epidermophyton Kaufman-Wolf. The incubation period of 21 days in the case of Epidermophyton Kaufman-Wolf was chosen with reference to the aforementioned instructions, because in the evaluation of disinfectants against skin fungi, an agent is regarded as suitable when the growth of the fungi after a specified period of action of the agent is inhibited for at least 21 days. It was then ascertained which concentration of substance incorporated in the culture medium was just able completely to stop the growth of the test germ. This value thus found was denoted as the inhibiting concentration. The investigations were carried out on the following intervals of concentrations: 20,000, 10,000, 5,000, 2,500, 1,000, 750, 500, 250, 100, 50, 25, 10, 5, 2.5, 1, 0.5, 0.25 and 0.1 ppm.

The inhibiting concentrations listed in the following Table I were found by this plate test.

The test organisms used for the comparative experiment were:

1. *Staphylococcus aureus*
2. *Escherichia coli*
3. *Pseudomonas aeruginosa*
4. *Candida albicans*
5. *Epidermophyton Kaufman-Wolf*
6. *Aspergillus niger*

The substances used for comparison were:
A—5-bromo-5-nitro-1,3-dioxane of the invention
B—2-bromo-2-nitro-propanediol-1,3
C—1,3-dioxane.

TABLE I

| Substance | Test organism | | | | | |
|---|---|---|---|---|---|---|
| | 1 | 2 | 3 | 4 | 5 | 6 |
| | Inhibiting concentrations in the plate test in p.p.m. | | | | | |
| A | 50 | 50 | 50 | 10 | 1 | 10 |
| B | 25 | 50 | 10 | 500 | 50 | |
| C | 10,000 | 10,000 | 10,000 | 10,000 | 1,000 | 10,000 |

In addition, the inhibiting action of substances A and B was determined in the agar hole test. For this, Petri dishes of about 9 cm. diameter were filled with 10 ml. of broth-agar or beer wort-agar and the surface was inoculated with the test organisms with a spatula. In the center of the dish a hole of 10 mm. diameter was pressed out from the culture medium and filled with a 10% solution of the substance.

The reading of the results was effected after 24 hours, and in the case of Epidermophyton after good development of the test organism.

TABLE II

| Substance | Test organism | | | | | |
|---|---|---|---|---|---|---|
| | 1 | 2 | 3 | 4 | 5 | 6 |
| A | 22 | 13 | 15–16 | 25–27 | (¹) | (¹) |
| B | 15–20 | 15–18 | 15–19 | 15–17 | 14–16 | |

¹ No growth.

The numbers give the width of the aureole produced by the inhibition in millimeters, measured from the edge of the hole up to the region of uninhibited growth.

The antimicrobial action of the substances A and B was also examined from the gas phase. For this purpose Petri dishes were filled to half their height with beer wort-agar and the surface was inoculated with the test organisms with a spatula. A filter paper which just fitted in the cover of the Petri dish and which had been charged with the substance to be investigated, was placed in the cover. The filter paper had, therefore, no contact with the culture medium, but was about 5 to 6 mm. above it. The paper was charged in each case with 0.5 ml. of an alcoholic solution of the substance to be investigated at various concentrations, by which method the amount of substance remaining on the filter paper was easy to define. The values given in Table III represent the amounts of substances in mg. which were present on the filter paper and which could just stop growth. The period of observation was 14 days.

TABLE III

| Substance | Test organism | | |
|---|---|---|---|
| | 4 | 5 | 6 |
| | Concentration in mg. | | |
| A | 5 | 5 | 5 |
| B | 25 | 25 | 1 |

The compositions of some antimicrobial materials are given below.

Example 4

| | Parts |
|---|---|
| Antimicrobial solution 5-bromo-5-nitro-1,3-dioxane | 0.25 |
| Dilute alcohol | Up to 50.0 |

ANTIMICROBIAL OINTMENTS

Example 5

| | Parts |
|---|---|
| 5-bromo-5-nitro-1,3-dioxane | 1.0 |
| White vaseline | Up to 100.0 |

Example 6

| | Parts |
|---|---|
| 5-bromo-5-nitro-1,3-dioxane | 1.0 |
| Ungentum alcohol. lanae | Up to 100.0 |

Example 7

| | Parts |
|---|---|
| 5-bromo-5-nitro-1,3-dioxane | 1.0 |
| Polyethylene glycol 300 and polyethylene glycol 1500 1:1 | Up to 100.0 |

Example 8

| | Parts |
|---|---|
| 5-bromo-5-nitro-1,3-dioxane | 1.0 |
| Decyl oleate | 16.0 |
| Colloidally dispersed mixture of 90 parts of $C_{16}$–$C_{18}$ alcohol and 10 parts of sodium $C_{16}$–$C_{18}$ alcohol sulfate | 24.0 |
| Water | 60.0 |

DAY CREAM AND LOTION

Example 9

| | Parts |
|---|---|
| 5-bromo-5-nitro-1,3-dioxane | 0.5 |
| Decyl oleate | 10.0 |
| Vegetable oil | 10.0 |
| Glycerine 28° Bé. | 5.0 |
| Colloidally dispersed mixture of 90 parts of $C_{16}$–$C_{18}$ alcohols and 10 parts of sodium lauryl sulfate | 15.0 |
| Water | 60.0 |

ANTIMICROBIAL POWDER

Example 10

| | Parts |
|---|---|
| 5-bromo-5-nitro-1,3-dioxane | 1.0 |
| Talcum venet. | Up to 100.0 |

CLEAR SHAMPOO

Example 11

| | Parts |
|---|---|
| 5-bromo-5-nitro-1,3-dioxane | 0.2 |
| Sodium lauryl ether sulfate (27 to 28% WAS) | 40.0 |
| Coconut fatty acid diethanolamide | 6.0 |
| Water | 54.0 |

EMULSION SHAMPOO

Example 12

| | Parts |
|---|---|
| 5-bromo-5-nitro-1,3-dioxane | 0.2 |
| Sodium lauryl sulfate (90% WAS) | 10.0 |
| Coconut fatty acid diethanolamide | 3.0 |
| Ethylene glycol stearate | 2.0 |
| Sodium chloride | 1.0 |
| Water | 84.0 |

SHAMPOO WITH EGG YOLK

Example 13

| | Parts |
|---|---|
| 5-bromo-5-nitro-1,3-dioxane | 0.5 |
| $C_{12}$–$C_{18}$ fatty alcohol sulfate mixture (40% WAS) | 45.0 |
| Commercial liquid egg yolk | 2.0 |
| Sodium chloride | 0.3 |
| Water | 52.7 |

FOAM BATH

Example 14

| | Parts |
|---|---|
| 5-bromo-5-nitro-1,3-dioxane | 0.2 |
| Sodium lauryl ether sulfate (27 to 28% WAS) | 70.0 |
| Coconut fatty acid diethanolamide | 5.0 |
| Water | 25.0 |

ANTIMICROBIAL SOAP

Example 15

In this usual production of a toilet soap from a mixture of 60% of coconut fatty acid and 40% tallow fatty acid, there are incorporated in the screw extruder together with the dyestuff and the perfume, such amounts of 5-bromo-5-nitro-1,3-dioxane that the finished soap contains 1% by weight thereof. The action of the antimicrobial substance is further increased if a complex-forming compound such as nitrilotriacetic acid (NTA), ethylenediaminotetraacetic acid (EDTA), or hydroxyethyl-1,1-diphosphonic acid (EHDP) is incorporated in such amount that its production in the soap amounts to 8% by weight.

BOTTLE CLEANING COMPOSITION FOR THE BEVERAGE INDUSTRY:

Example 16

| | Parts by weight |
|---|---|
| Technical sodium hydroxide | 47.2 |
| Tetrapolyphosphate | 20.0 |
| $Na_2O \cdot 3 \cdot 3\ SiO_2$ | 13.0 |
| Sodium aminotri-(methylenephosphate) | 12.0 |
| 5-bromo-5-nitro-1,3-dioxane | 2.0 |
| Sodium olefinsulfonate | 5.5 |
| Foam inhibitor | 0.3 |

PREWASHING COMPOSITION WITH SIMULTANEOUS ANTIMICROBIAL ACTION

Example 17

| | Parts by weight |
|---|---|
| Sodium olefinsulfonate | 8.0 |
| Soap | 4.0 |
| Foam inhibitor | 0.3 |
| $Na_4P_2O_7$ | 36.0 |
| NaOH | 7.5 |
| $Na_2SO_4$ | 10.2 |
| 5-bromo-5-nitro-1,3-dioxane | 4.0 |
| Water | 30.0 |

ANTIMICROBIAL CLEANING COMPOSITION FOR LAUNDRIES

Example 18

| | Parts by weight |
|---|---|
| Fatty alcohol sulfate (sodium salt) | 25.0 |
| $Na_5P_3O_{10}$ | 35.0 |
| $Na_2CO_3$ | 7.0 |
| $Na_2SO_4$ | 15.0 |
| $Na_2O \cdot 3 \cdot 3\ SiO_2$ | 5.0 |
| Carboxymethylcellulose | 1.0 |
| 5-bromo-5-nitro-1,3-dioxane | 2.0 |
| Pentasodium aminotrimethylenephosphate | 10.0 |

ANTIMICROBIAL ACID CLEANING COMPOSITION FOR THE BEVERAGE INDUSTRY

Example 19

| | Parts by weight |
|---|---|
| Phosphoric acid (80%) | 50.0 |
| Nonylphenol condensed with 9 mols ethylene oxide | 4.0 |
| 1-hydroxyhexane-1,1-disphosphonic acid | 5.0 |
| 5-bromo-5-nitro-1,3-dioxane | 1.0 |
| Water | 40.0 |

5-bromo-5-nitro-1,3-dioxane finds further use as an antimicrobial substance in chemical cleaning liquids based on organic solvents with a low water content. The 5-bromo-5-nitro-1,3-dioxane is added to the cleaning baths in a concentration of 0.5 to 5 gm. per liter. Cleaning intensifiers based on anionic and non-ionic surface-active compounds are added to the cleaning baths usually in the form of concentrates, which contain besides the surface-active compounds, solvents such as chlorinated hydrocarbons or mineral oils, and also in some cases solution aids such as, for example, isopropanol and water. 5-bromo-5-nitro-1,3-dioxane can be incorporated in these concentrates and measured out together with the intensifier. In chemical cleaning, water is added to the baths in such amount that during the cleaning process the relative humidity in the vapor space over the bath amounts to at least 70%.

The advantage obtainable with the substance according to the invention consists in that, owing to its great activity and good stability, it is possible to prepare with it neutral, acid and also alkaline compositions which ensure a positive protection against bacterial and fungal attack.

The preceding specific embodiments are illustrative of the practice of the invention. It is to be understood, however, that other expedients known to those skilled in the art may be employed without departing from the spirit of the invention or the scope of the appended claims.

We claim:

1. A process for the prevention of the growth of microorganisms selected from the group consisting of gram-positive bacteria, gram-negative bacteria and fungi which consists essentially of contacting said microorganisms with an amount effective to prevent the growth of said microorganisms of 5-bromo-5-nitro-1,3-dioxane.

2. A process for the prevention of the growth of microorganisms selected from the group consisting of gram-positive bacteria, gram-negative bacteria and fungi in a cosmetic or pharmaceutical preparation which consists essentially of contacting said preparation with an amount effective to prevent the growth of said microorganisms of 5-bromo-5-nitro-1,3-dioxane.

3. The process of claim 2 wherein said preparation is a cosmetic preparation.

4. The process of claim 2 wherein said preparation is a pharmaceutical preparation.

References Cited

Chemical Abstracts, vol. 59 (1953), 5183–5184; vol. 64, 5689 (1966).

STANLEY J. FRIEDMAN, Primary Examiner

F. E. WADDELL, Assistant Examiner

U.S. Cl. X.R.

252—160, 107